US008959133B2

United States Patent
Sun et al.

(10) Patent No.: US 8,959,133 B2
(45) Date of Patent: Feb. 17, 2015

(54) SYSTEM AND METHOD FOR CONFIGURABLE MIXED RADIX FFT ARCHITECTURE FOR MULTIMODE DEVICE

(75) Inventors: Yanmeng Sun, Shanghai (CN); Liangliang Hu, Shanghai (CN)

(73) Assignee: NXP, B.V., Eindhoven (NL)

( * ) Notice: Subject to any disclaimer, the term of this patent is extended or adjusted under 35 U.S.C. 154(b) by 1130 days.

(21) Appl. No.: 12/988,328

(22) PCT Filed: Apr. 14, 2009

(86) PCT No.: PCT/IB2009/051563
§ 371 (c)(1),
(2), (4) Date: Jan. 12, 2011

(87) PCT Pub. No.: WO2009/128033
PCT Pub. Date: Oct. 22, 2009

(65) Prior Publication Data
US 2011/0099216 A1    Apr. 28, 2011

Related U.S. Application Data

(60) Provisional application No. 61/046,094, filed on Apr. 18, 2008.

(51) Int. Cl.
G06F 15/00 (2006.01)
G06F 17/14 (2006.01)
H04L 27/26 (2006.01)

(52) U.S. Cl.
CPC ............ *G06F 17/142* (2013.01); *H04L 27/263* (2013.01); *H04L 27/265* (2013.01)

USPC .......................................................... 708/408

(58) Field of Classification Search
CPC ...................................................... G06F 17/144
USPC .................................................... 708/404, 408
See application file for complete search history.

(56) References Cited

U.S. PATENT DOCUMENTS

| 4,528,641 | A   |   | 7/1985 | Burrows |
|-----------|-----|---|--------|---------|
| 4,689,762 | A   | * | 8/1987 | Thibodeau, Jr. ............... 708/409 |
| 6,751,643 | B2  | * | 6/2004 | Jaber ............................... 708/409 |
| 7,164,723 | B2  | * | 1/2007 | Sunwoo .......................... 375/260 |

(Continued)

FOREIGN PATENT DOCUMENTS

EP    2 144 172 A1    1/2010

OTHER PUBLICATIONS

Johnson, H., et al. "An In-Order, In-Place Radix-2 FFT," IEEE Int'l. Conf. on Acoustics, Speech and Signal Processing, vol. 9, part 1, pp. 473-476 / 28A.2.1-28A.2.4 (Mar. 1984).

(Continued)

*Primary Examiner* — Chuong D Ngo

(57) ABSTRACT

A configurable fast Fourier transforms (FFT) apparatus to compute radix-2 and non-radix-2 calculations. The configurable FFT apparatus includes a data input, a data output, an interconnect, and a configuration manager. The data input retrieves an input data segment from a memory device. The data output stores processed data to the memory device. The interconnect routes radix FFT signals of multi-type radix configurations from the data input to the data output. The configuration manager dynamically configures the interconnect according to a determination of a current radix configuration.

11 Claims, 7 Drawing Sheets

(56) References Cited

U.S. PATENT DOCUMENTS

| | | |
|---|---|---|
| 8,126,953 B2 * | 2/2012 | Shih .............................. 708/404 |
| 2005/0182806 A1 | 8/2005 | Krishnamoorthi et al. |
| 2006/0010188 A1 | 1/2006 | Solomon et al. |
| 2006/0184598 A1 | 8/2006 | Buchert et al. |
| 2010/0017452 A1 | 1/2010 | Lee et al. |

OTHER PUBLICATIONS

Agarwal, R. C., et al. "Vectorized Mixed Radix Discrete Fourier Transform Algorithms," Proc. of the IEEE, vol. 75, No. 9, pp. 1283-1292 (Sep. 1987).

Yang, Z. et al. "Design of a 3780-Point IIFT Processor for TDS-OFDM," IEEE Trans. on Broadcasting, vol. 48, No. 1, pp. 57-61 (Mar. 2002).

Basu, J. et al. "A New Generalized Reconfigurable Architecture for Digital Signal Processor," 15th Intl. Conf. on Advanced Computing and Communications, pp. 333-338 (2007).

International Search Report and Written Opinion for International Patent Appln. No. PCT/IB2009/051563 (Sep. 13, 2010).

* cited by examiner

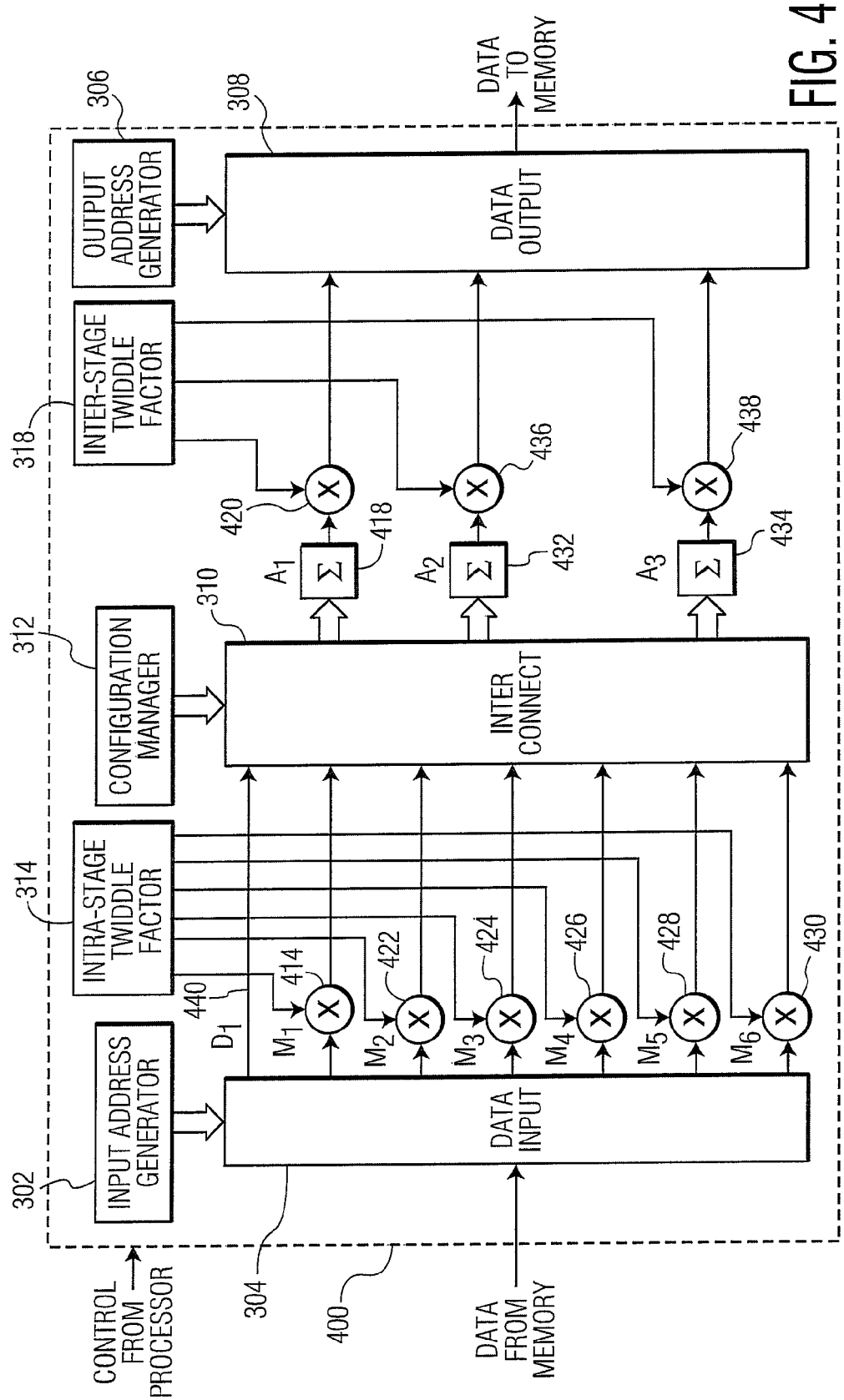

SYSTEM AND METHOD FOR CONFIGURABLE MIXED RADIX FFT ARCHITECTURE FOR MULTIMODE DEVICE

High speed and reliability are driving the future of wireless communication and data systems. Multi-carrier modulation is one solution to this pursuit. Multi-carrier modulation combats multi-path and dispersive channel interference. Orthogonal Frequency Division Multiplexing (OFDM) is one type of multi-carrier system which is widely used in different wireless communication systems such as wireless local area network (WLAN), digital audio broadcasting (DAB), and digital video broadcasting (DVB). In OFDM systems, data symbols are transmitted in parallel on multiple sub carriers and Fast Fourier Transform (FFT) is used to modulate data symbols to these sub carriers. The implementation of FFT is one of the most difficult parts in the realization of an OFDM system and often consumes substantial processing resources.

FFT is not only used in OFDM system. In some wireless communication systems like cellular technology, frequency domain signal processing such as frequency domain equalizers are often used. These processing modules implement FFT to convert a signal from the time domain to the frequency domain.

$$X(k) = \sum_{n=0}^{N-1} x(n) e^{-j2\pi k n/N} = \sum_{n=0}^{N-1} x(n) W_N^{kn} \quad (1)$$

Equation (1) describes the calculation of an FFT, in which $W_N^{kn} = e^{-j2\pi kn/N}$ is a twiddle factor. Analysis of equation (1) shows that the computation load of FFT is quite high. In order to reduce the complexity, dedicated FFT hardware and software implementations are used. But most dedicated structures are designed for radix-2 or power-of-2 configurations, which invoke less computation load than a non-power-of-2 configuration, or mixed FFT configurations such as radix-3 and radix-5. Conventional multi-mode FFT systems use multiple, dedicated FFT structures to perform multi-mode radix FFT computations and power-of-2 radix computations. One dedicated FFT structure is implemented for only power-of-2 radix configurations, and another dedicated FFT structure is implemented for only non-power-of-2 radix configurations. One example of a multi-mode FFT configuration is Digital Multimedia Broadcast-Terrestrial/Handheld (DMB-T/H) which is the Chinese terrestrial TV broadcasting system. The FFT configuration applied in DMB-T/H system uses a 3780 FFT structure which implements radices of 2, 3, 5 and 7.

The Cooley-Tukey algorithm (CTA) is the most common FFT algorithm that decomposes an arbitrary composite N point discrete Fourier transform (DFT) in terms of smaller DFTs of size $N_1$ and $N_2$ such that $N=N_1 N_2$. This decomposition can be done recursively to reduce the computational complexity to O(NlogN). For example, the most well known O(NlogN) radix-2 decimation-in-time (DIT) or decimation-in-frequency (DIF) FFT comes from CTA. A general description of the CTA for a composite size $N=N_1 \times N_2$ is shown as follows $$X_{N_2 k_1 + k_2} = \sum_{n_1=0}^{N_1-1} \sum_{n_2=0}^{N_2-1} x_{N_1 n_2 + n_1} e^{-\frac{2\pi i}{N_1 N_2}(N_1 n_2 + n_1)(N_2 k_1 + k_2)} \quad (2)$$

$$= \sum_{n_1=0}^{N_1-1} [e^{-\frac{2\pi i}{N} n_1 k_2}] \left( \sum_{n_2=0}^{N_2-1} x_{N_1 n_2 + n_1} e^{-\frac{2\pi i}{N_2} n_2 k_2} \right) e^{-\frac{2\pi i}{N_1} n_1 k_1}$$

Equation (2) shows that if $N=N_1 \times N_2$, the N point FFT can be divided to two smaller size FFT with point $N_1$ and $N_2$. Following this rule, N can be finally divided into some set of prime factors. Then the N point FFT can be realized by specific FFT which use substantially lower computation load than larger FFT. As the small FFT can be implemented by a butterfly operation, the N point FFT calculation is divided into several butterfly computation stages. Between every two stages, the inter-stage twiddle factors are multiplied with data symbols.

FIG. 1 depicts a radix-3 butterfly FFT interconnection diagram 100. FIG. 1 is an example of a radix-3 butterfly calculation stage. There are two sets of twiddle factors, $w_3^n$ are intra-stage factors 102 which are used inside butterfly calculations, and $w_N^n$ are inter-stage factors 104 used to divide large FFTs into smaller ones. A dedicated radix-3 FFT configuration that implements calculations of the radix-3 butterfly FFT interconnection diagram 100 cannot be applied again if the FFT point size or radix changes. That is to say, a conventional dedicated FFT structure for a specific radix does not support multi-mode FFT because it cannot process other sizes of radix. For example, a radix-2 FFT structure cannot process radix-3 configurations. For the 3780 FFT structure applied in DMB-T/H systems conventional FFT systems implement four discrete FFT modules to compute the radices of 2, 3, 5, and 7. Thus, conventional 3780 systems implement a dedicated radix-2 FFT module, a dedicated radix-3 FFT module, a dedicated radix-5 FFT module, and a dedicated radix-7 FFT module.

Embodiments of an apparatus are described. In one embodiment, the apparatus is a configurable fast Fourier transform (FFT) apparatus to compute radix-2 and non-radix-2 calculations. The configurable FFT apparatus includes a data input, a data output, an interconnect, and a configuration manager. The data input retrieves an input data segment from a memory device. The data output stores processed data to the memory device. The interconnect routes radix FFT signals of multi-type radix configurations from the data input to the data output. The configuration manager dynamically configures the interconnect according to a determination of a current radix configuration. Other embodiments of the apparatus are also described.

Embodiments of a method are also described. In one embodiment, the method is a method for dynamically configuring a configurable FFT apparatus. The configurable FFT method includes supplying an input data address for an input data segment, wherein the input data segment comprises a plurality of discrete data inputs. The configurable FFT method also includes determining a radix configuration of an input data segment from a data input, wherein the data input retrieves the input data segment from a memory device. The configurable FFT method also includes storing processed data to the memory device. The configurable FFT method also includes supplying an output data address for the processed data. The configurable FFT method also includes dynamically configuring an interconnect to route radix FFT signals of multi-type radix configurations from the data input to the data output according to the determination of the current radix configuration. Other embodiments of the method are also described.

Other aspects and advantages of embodiments of the present invention will become apparent from the following detailed description, taken in conjunction with the accompanying drawings, illustrated by way of example of the principles of the invention.

FIG. 4 depicts a schematic block diagram of another embodiment of the configurable FFT apparatus.

FIGS. 5A, 5B, 5C, and 5D depict schematic block diagrams of several butterfly interconnection operations of the configurable FFT apparatus of FIG. 4.

Figure 3:
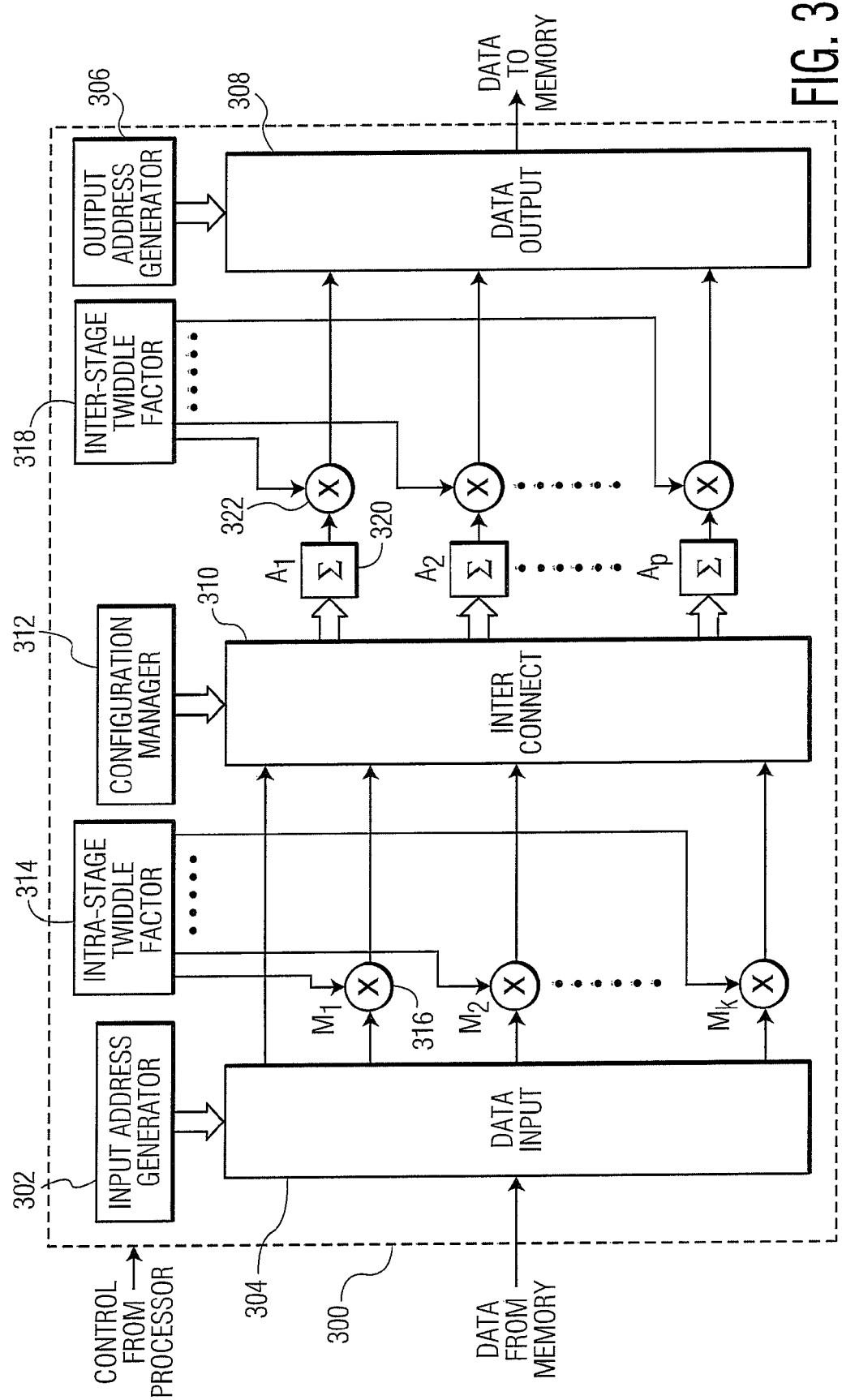
FIG. 3 depicts a schematic block diagram of one embodiment of a configurable FFT apparatus.
Figure 6:
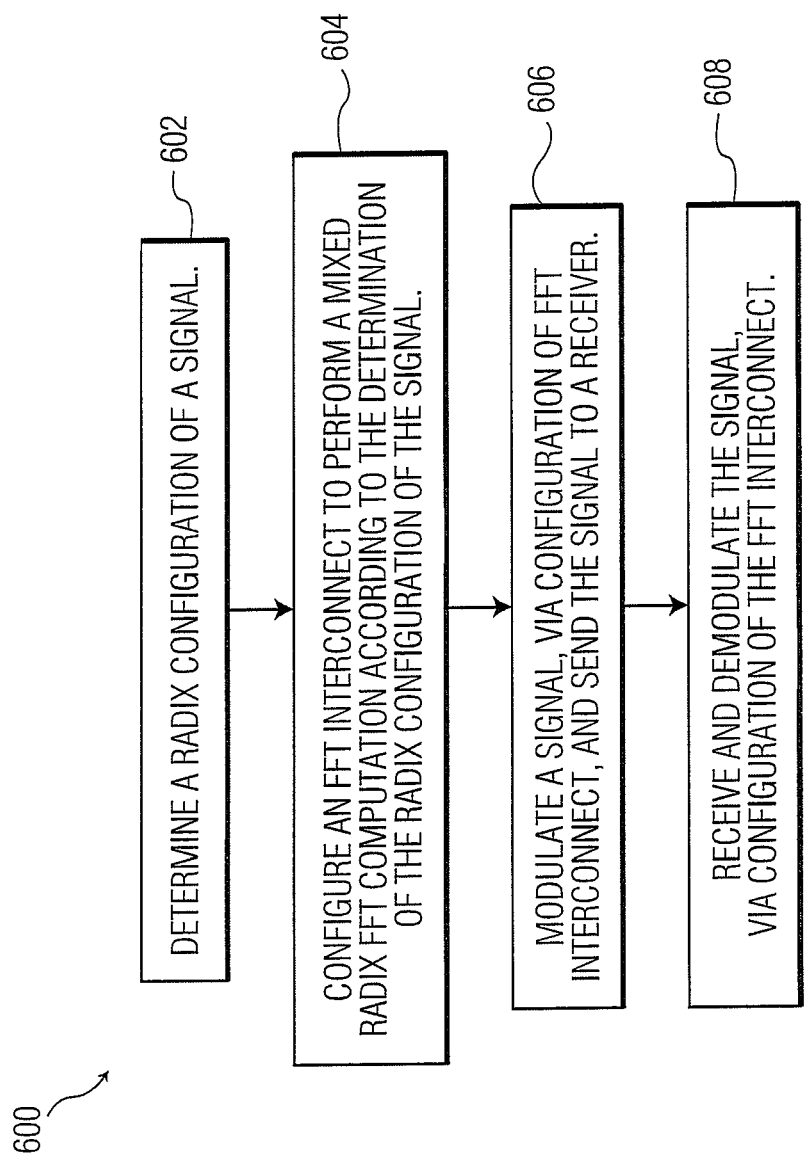

FIG. 6 depicts a schematic flow chart diagram of one embodiment of a configurable FFT method for use with the FFT apparatus of FIG. 3.

Throughout the description, similar reference numbers may be used to identify similar elements.

Figure 1:
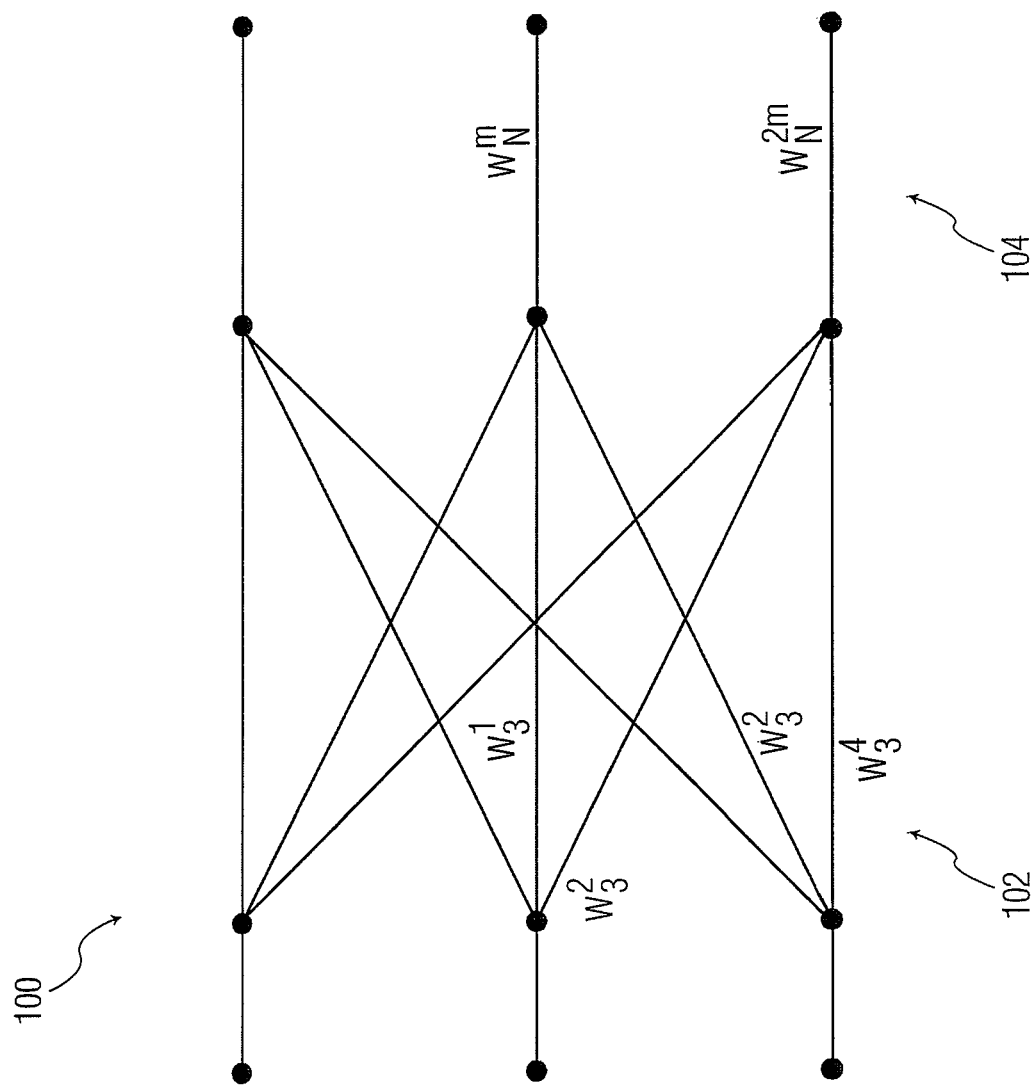
FIG. 1 depicts a radix-3 butterfly FFT interconnection diagram.
Figure 2:
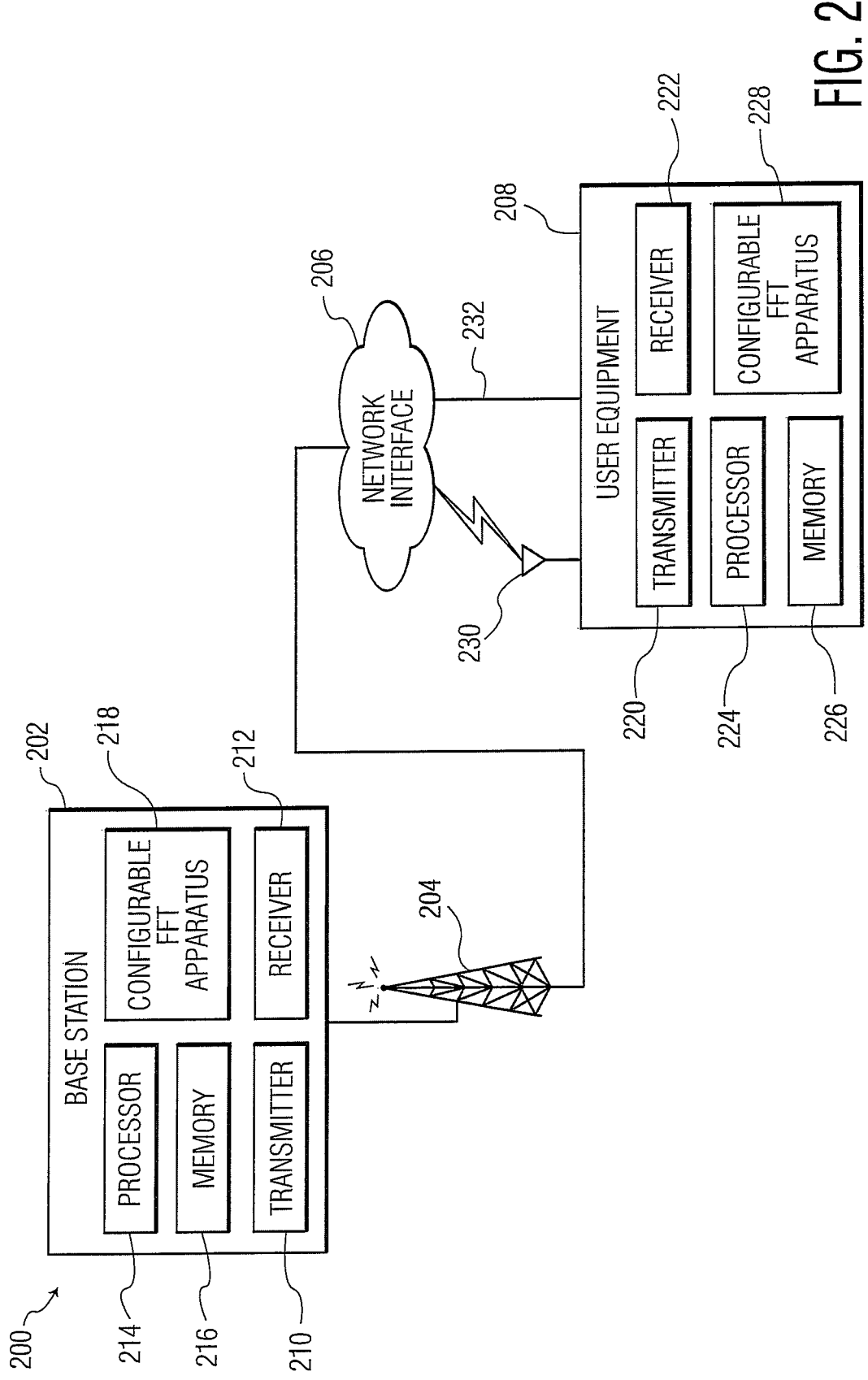
FIG. 2 depicts a schematic block diagram of one embodiment of a network communication system.

FIG. 2 depicts a schematic block diagram of one embodiment of a network communication system 200. As depicted in FIG. 2, the network communication system 200 includes a base station (BS) 202, at least one antenna 204, a network interface 206, and a user equipment (UE) 208. Although the depicted network communication system 200 is shown and described herein with certain components and functionality, other embodiments of the network communication system 200 may be implemented with fewer or more components or with less or more functionality. For example, some embodiments of the network communication system 200 include at least one base station 202, at least one network interface 206, and at least one UE 208. Additionally, some embodiments of the network communication system 200 include similar components arranged in another manner to provide similar functionality, in one or more aspects.

The base station 202 includes a transmitter 210, a receiver 212, a processor 214, a memory device 216, and a configurable Fast Fourier Transform (FFT) apparatus 218. The base station 202 connects to the network interface 206 through the antenna 204. In one embodiment, the base station 202 is a radio receiver/transmitter, or transceiver. In some embodiments, the base station 202 is a hub of a local wireless network. In further embodiments, the base station 202 is a gateway between a wired network and a wireless network. In another embodiment, the base station 202 is a wireless communications station installed at a fixed location. In some embodiments, the base station 202 is a wireless cell phone tower and/or wireless data tower.

In one embodiment, the transmitter 210 modulates signals in a multi-mode FFT environment according to a multi-mode radix FFT computation. In some embodiments, the transmitter 210 modulates one of the signals using binary phase-shift keying (BPSK), quadrature phase-shift keying (QPSK), or quadrature amplitude modulation (QAM) and sends a modulated signal to a UE 208. Hence, the signals modulated by the transmitter 210 may include power-of-2 radix signals and/or non-power-of-2 radix signals. The power-of-2 radix signals are computed according to a power-of-2 radix configuration of the configurable FFT apparatus 218 and are sent to UEs 208 configured for power-of-2 radix operation. The non-power-of-2 radix signals are computed according to a non-power-of-2 radix configuration of the configurable FFT apparatus 218 and are sent to UEs 208 configured for non-power-of-2 radix operation. In one embodiment, the transmitter 210 modulates the signals according to a multi-mode radix FFT configuration of the FFT apparatus 218. As used herein, a multimode radix FFT signal includes a combination of radix- and non-radix-2 signals. The transmitter 210 then transmits the multi-mode FFT signal to at least one UE 208.

In one embodiment, in a multi-mode FFT environment, the receiver 212 of the base station 202 receives a signal from at least one UE 208. Like the transmitted signals, the received signals include power-of-2 radix signals and non-power-of-2 radix signals. The receiver 212 then demodulates the received signals according to the respective power-of-2 radix and non-power-of-2 radix configurations of the received signals. In one embodiment, the receiver 212 demodulates the received signals according to a mixed FFT computation and/or process of the FFT apparatus 202.

In one embodiment, the processor 214 is a central processing unit (CPU) with one or more processing cores. In some embodiments, the processor 214 is a network processing unit (NPU) or another type of processing device such as a general purpose processor, an application specific processor, a multi-core processor, or a microprocessor. Alternatively, a separate processor may be coupled to the configurable FFT apparatus 218. In some embodiments, the processor 214 is configured to control the operations of the configurable FFT apparatus 218. In general, the processor 214 executes one or more instructions to provide operational functionality to the base station 202. The instructions may be stored locally in the processor 214 or in the memory device 216. Alternatively, the instructions may be distributed across one or more devices such as the processor 214, the memory device 216, the configurable FFT apparatus 218, or another data storage device.

In some embodiments, the memory device 216 is a random access memory (RAM) or another type of dynamic storage device. In some embodiments, the memory device 216 is a read-only memory (ROM) or another type of static storage device. In some embodiments, the illustrated memory device 216 is representative of both RAM and static storage memory within a network communication system 200. In some embodiments, the memory device 216 is content-addressable memory (CAM). In some embodiments, the memory device 216 is an electronically programmable read-only memory (EPROM) or another type of storage device. Additionally, some embodiments store instructions as firmware such as embedded foundation code, basic input/output system (BIOS) code, cluster optimization code, and/or other similar code.

In one embodiment, the configurable FFT apparatus 218 performs multi-mode radix FFT computations and dynamically adjusts an FFT butterfly interconnection. In some embodiments, the configurable FFT apparatus 218 performs a multi-mode radix FFT computation in response to a determination of the radix configuration of a received signal and dynamically adjusts the FFT butterfly interconnection according to the multi-mode radix FFT computation according to the determination of the radix configuration of the received and/or transmitted signal. In other words, the configurable FFT apparatus 218 enables the base station 202 to perform FFT algorithms for power-of-2 radix configurations and non-power-of-2 radix configurations on a single dedicated FFT structure.

Following the generation of the modulated signal, the base station 202 transmits the signal to at least one UE 208 through the base station antenna 204. In one embodiment, the antenna 204 transmits and/or receives network communications between the base station 202 and at least one UE 208 through the network interface 206. The base station antenna 204 may include an omni-directional antenna, directional antenna, sectoral antenna, panel antenna, and/or other type of antenna.

In some embodiments, the base station antenna 204 sends a modulated signal over the air (OTA), through the network interface 206. In some embodiments, the base station antenna 204 sends the modulated signal over physical transmission lines such as a coaxial transmission line. Thus, the network interface 206 may facilitate OTA wireless transmissions as well as physical wired transmissions. In a further embodiment, the antenna 204 includes multiple antennas attached to the base station 202, such as the multiple antennas used in multiple-input and multiple-output (MIMO) systems.

The UE 208 also includes a transmitter 220, a receiver 222, a processor 224, a memory device 226, and a configurable FFT apparatus 228. At least some of the components of the UE 208 are substantially similar and operate in a substantially similar manner to the components described above with regard to the BS 202. Additionally, the UE 208 also includes at least one UE antenna 230 and a wired network connection 232. In some embodiments, the UE 208 includes the antenna 230 or the wired network connection 232. The UE 208 may be a desktop computer, a laptop computer, a personal digital assistant (PDA), a cell-phone, a voice-over internet protocol (VoIP) telephone, or other similar client devices.

The configurable FFT apparatus 228 of the UE 208 operates substantially similar to the configurable FFT apparatus 218 of the base station 202. In one embodiment, the BS transmitter 210 modulates a signal according to a radix configuration of the UE 208 and/or BS 202 and transmits the modulated signal across the network interface 206 to the UE 208 via the BS antenna 204. The BS transmitter 210 modulates the signal according to the operations of the BS configurable FFT apparatus 218. The UE receiver 222 receives the modulated signal from the base station 202 and demodulates the modulated signal according to the operations of the UE configurable FFT apparatus 228.

In another embodiment, the UE transmitter 220 modulates a signal according to a radix configuration of the UE 208 and/or BS 202 and transmits the modulated signal across the network interface 206 to the BS 202 via the UE antenna 230. The UE transmitter 220 modulates the signal according to the operations of the UE configurable FFT apparatus 228. The BS receiver 212 receives the modulated signal from the UE 208 and demodulates the modulated signal according to the operations of the BS configurable FFT apparatus 218.

In some embodiments, the UE 208 transmits and receives signals through the antenna 230 and/or wired network connection 232. Thus, the transmission and/or reception of a signal may be over a wired connection or over a wireless transmission. Exemplary wired connections include 10/100/1000 BASE-T Ethernet, coaxial cable communications such as Cable Television (CATV) and cable internet, Universal Serial Bus (USB), Institute of Electrical and Electronics Engineers (IEEE) 1394, Recommended Standard 232 (RS-232), etc. Exemplary wireless connections include Wireless-Fidelity (Wi-Fi), WiMAX, 3rd Generation Partnership Project (3GPP), Universal Mobile Telecommunications System (UMTS), High-Speed Packet Access (HSPA), Infrared Data Association (IrDa), Bluetooth, including transport layers implemented over any of Wireless Access Protocol (WAP), Hypertext Transfer Protocol (HTTP), Object Exchange (OBEX), or other similar transports. The depicted components of the base station 202 and/or user equipment 208 may include one or more bus interfaces (not shown) to facilitate communications related to performing a multi-mode radix FFT computation on the BS configurable FFT apparatus 218 and/or UE configurable FFT apparatus 228, as well as storing, sending, and receiving data packets associated with the multi-mode radix FFT computation.

FIG. 3 depicts a schematic block diagram of one embodiment of a configurable FFT apparatus 300. The configurable FFT apparatus 300 may be substantially similar to the BS configurable FFT apparatus 218 and/or UE configurable FFT apparatus 228 with regard to FIG. 2. The configurable FFT apparatus 300 includes an input address generator 302, a data input module 304, an output address generator 306, and a data output module 308. Additionally, the configurable FFT apparatus 300 also includes an interconnect module 310, a configuration manager 312, an intra-stage twiddle generator 314, and at least one intra-stage multiplier 316. Additionally, the configurable FFT apparatus 300 also includes an inter-stage twiddle generator 318, at least one accumulator 320, and at least one inter-stage multiplier 322. Although the depicted configurable FFT apparatus 300 is shown and described herein with certain components and functionality, other embodiments of the configurable FFT apparatus 300 may be implemented with fewer or more components or with less or more functionality. For example, some embodiments of the configurable FFT apparatus 300 include at least one data input module 304, a plurality of interconnect modules 310, and at least one data output module 308. Additionally, some embodiments of the configurable FFT apparatus 300 include similar components arranged in another manner to provide similar functionality, in one or more aspects.

In one embodiment, the depicted configurable FFT apparatus 300 computes multi-mode radix FFT computations. In some embodiments, the configurable FFT apparatus 300 supports any FFT stage from radix $R_{min}$ to radix $R_{max}$. In other words, the configurable FFT apparatus 300 provides a single dedicated structure to compute power-of-2 radix FFT computations and non-power-of-2 radix FFT computations. The configurable FFT apparatus 300 computes power-of-2 radix FFT computations and non-power-of-2 radix FFT computations on the same dedicated structure by adjusting an FFT butterfly interconnection. The FFT butterfly interconnection, in some embodiments, includes at least the interconnect module 310, the configuration manager 312, the intra-stage twiddle generator 314, the intra-stage multipliers 316, the inter-stage twiddle generator 318, the accumulators 320, and the inter-stage multipliers 322. By adjusting the configuration of one or more of these components of the configurable FFT apparatus 300, the configurable FFT apparatus 300 enables a BS 202 and UE 208 to compute both power-of-2 and non-power-of-2 radix FFT computations with the same, configuration hardware.

In one embodiment, the configurable FFT apparatus 300 dynamically adjusts the FFT butterfly interconnection to perform multi-mode radix FFT computations on a transmission signal in response to a determination of the radix configuration of the source and/or destination of the transmission signal. In some embodiments the configurable FFT apparatus 300 performs power-of-2 and non-power-of-2 radix FFT computations for one transmission signal. In some embodiments, the configurable FFT apparatus 300 performs either power-of-2 or non-power-of-2 radix FFT computations for one transmission signal. Thus, the configurable FFT apparatus 300 is configured to compute any stage of FFT butterfly operation. In one embodiment, the configurable FFT apparatus 300 performs a mixed FFT recursive algorithm to decompose an N point discrete Fourier transform according to a determination of the current radix configuration.

In one embodiment, the input address generator 302 supplies the data input module 304 with an input data address for a segment of input data. The segment of input data addressed by the input address generator 302 from memory is accessed from memory by the data input module 304 and sent to the intra-stage multipliers 316. In some embodiments, the segment of input data is discrete data. In some embodiments, a predetermined number of intra-stage multipliers 316, $M_1$-$M_k$, are included in the configurable FFT apparatus 300. In some embodiments, the configurable FFT apparatus 300 is configured to dynamically enable one or more of the predetermined number of the intra-stage multipliers 316, $M_1$-$M_k$. Thus, the configurable FFT apparatus 300 is configured to enable a certain number of intra-stage multipliers 316 in an FFT computation according to the determination of the radix configuration associated with the segment of data as the segment of data relates to a transmission signal of a certain radix FFT configuration. As the configurable FFT apparatus 300 processes different segments of input data, the configurable FFT apparatus 300 adjusts the number of enabled intra-stage multipliers 316 according to the determination of the radix FFT configuration associated with each segment of input data. In some embodiments, the data input module 304 accesses a segment of input data stored in the BS or UE memory devices 216 and 226 using the input data address that the input address generator 302 supplies.

In one embodiment, the intra-stage multipliers 316 enabled by the configurable FFT apparatus 300 for a given segment of input data then multiply the segment of input data by one or more intra-stage twiddle factors. Twiddle factors refer to the root-of-unity complex multiplicative constants in an FFT butterfly operation of an FFT computation, such as the Cooley-Tukey FFT algorithm. Twiddle factors are used to recursively combine smaller discrete Fourier transforms. The values of the intra-stage twiddle factors are determined by the configurable FFT apparatus 300 according to the determination of the radix configuration associated with the given segment of input data. In some embodiments, for radix-2 FFT operation, the intra-stage twiddle factors are not used because the only factor in a radix-2 butterfly interconnection is negative one, or −1. However, for FFT stages of non radix-2, the intra-stage twiddle factors are used. In one embodiment, if the radix number is R, then the number of twiddle factors for the R stage is R−1.

In one embodiment, the interconnect module 310 links at least one intra-stage multiplier 316 to an accumulator 320 according to the determination of the current radix configuration. In some embodiments, the interconnect module 310 is controlled by the configuration manager 312. In some embodiments, the configuration manager 312 determines a current radix configuration based on the input data segment. In some embodiments, the configuration manager 312 dynamically configures the interconnect module 310 according to a determination of a current radix configuration. In some embodiments, the configuration manger 312 adjusts the physical routing links of the interconnect module 310 between the intra-stage multipliers 316 and the accumulators 320 according to the determination of the current radix configuration. In other words, the configuration manager 312 is configured to adjust the links of the interconnect module 310 that are between intra-stage multipliers 316 and the accumulators 320 for power-of-2 radix FFT configurations and for non-power-of-2 radix FFT configurations. In some embodiments, the configuration manager 312 determines a prime factor of the number of the discrete data inputs in the input data segment in order to control a sequence of operations of the interconnect module 310 according to the determination of the current radix configuration.

In some embodiments, the processor 214 is configured interface with the configuration manager 312 to control the configuration of the interconnect module 310. In some embodiments, the processor 214 is configured to control the sequencing associated with calculations and the linking of the data from the at least one intra-stage multiplier 316 and an accumulator 320.

In some embodiments, the configurable FFT apparatus 300 includes a predetermined number of accumulators 320, $A_1$-$A_p$. In some embodiments, the configurable FFT apparatus 300 is configured to enable one or more of the accumulators 320, $A_1$-$A_p$. In some embodiments, the configurable FFT apparatus 300 selects the number of accumulators 320, $A_1$-$A_p$, to enable in an FFT computation according to the determination of the radix configuration associated with the segment of data as the segment of data relates to a transmission signal of a certain radix FFT configuration. As the configurable FFT apparatus 300 processes different segments of input data, the configurable FFT apparatus 300 adjusts the number of enabled accumulators 320 according to the determination of the radix FFT configuration of each segment of input data. In one embodiment, the implemented accumulators 320 accumulate the product of the intra-stage multipliers 316 according to the physical routing links provided by the interconnect module 310.

In some embodiments, the configurable FFT apparatus 300 includes a predetermined number of inter-stage multipliers 322. In some embodiments, the configurable FFT apparatus 300 is configured to enable one or more of the inter-stage multipliers 322. In one embodiment, the configurable FFT apparatus 300 selects the number of inter-stage multipliers 322 to enable in an FFT computation according to the determination of the radix configuration associated with the segment of data as the segment of data relates to a transmission signal of a certain radix FFT configuration. As the configurable FFT apparatus 300 processes different segments of input data, the configurable FFT apparatus 300 adjusts the number of enabled inter-stage multipliers 322 according to the determination of the radix FFT configuration of each segment of input data.

The inter-stage multipliers 322 enabled by the configurable FFT apparatus 300 for a given segment of input data then multiply, in one embodiment, the segment of accumulated data by one or more inter-stage twiddle factors. Like the intra-stage twiddle factor, the inter-stage twiddle factors refer to the root-of-unity complex multiplicative constants in an FFT butterfly operations of an FFT computation to recursively combine smaller discrete Fourier transforms. The values of the inter-stage twiddle factors are determined by the configurable FFT apparatus 300 according to the determination of the radix configuration associated with the given segment of input data.

In some embodiments, the segment of input data is a discrete representation of time based data, or data from the time domain. The configurable FFT apparatus 300 transforms the segment of input data to the frequency domain using a multi-mode radix FFT computation. Thus, the data output module 308 receives the discrete Fourier transform of the input data that the data input module 304 provides to the configurable FFT apparatus 300. In one embodiment, the data output module 308 stores the discrete Fourier transform of the input data in the UE memory device 216 and/or the BS memory device 226. In some embodiments, the output address generator 306 provides the data output module 308 with the output data address where the discrete Fourier transform of the input data is stored in the memory device 216 and/or 226.

As the configurable FFT apparatus 300 supports different mixed radix FFT stages, the number of intra-stage multipliers 314, in one embodiment, is equal to the number of twiddle factors of a maximum radix among all possible radices. In some embodiments, the number of intra-stage multipliers 314 is greater than the number of twiddle factors of the maximum radix among all the possible radices. For example, if the maximum radix is $R_{max}$, to balance resources and performance, the number of intra-stage multipliers 314, or k of $M_k$, may be set equal to $R_{max}-1$. During the $R_{max}$ stage, $R_{max}-1$ intra-stage multipliers 314 are used to perform the $R_{max}$ butterfly calculation and only one accumulator 320 is used to accumulate the data from the $R_{max}$ stage. Likewise, assuming the minimum possible FFT radix is $R_{min}$, to increase a relative efficiency, some $R_{min}$ butterfly calculations are performed in parallel. In one embodiment, the number of calculations running in parallel is given by $$N_{max} = \left\lfloor \frac{R_{max}}{R_{min}} \right\rfloor$$

As each butterfly calculation uses at least one accumulator 320, in one embodiment, the number of accumulators 320 implemented is also set equal to $N_{max}$. Since $N_{max}$ determines the number of accumulators 320 and parallel calculations, $N_{max}$ is rounded down to a whole number. Thus, in the case of a non-zero remainder in the calculation of $N_{max}$ above, the remainder is dropped, and only the quotient is used to determine the number of parallel calculations and number of implemented accumulators 320.

As explained above, in order to connect butterfly computation results to accumulators 320, the interconnect module 310 is arranged between the intra-stage multipliers 316 and the accumulators 320. During the radix $R_{max}$ stage, there is only one accumulator $A_1$ in use and all the multiplier results are linked by the interconnect module 310 to accumulator $A_1$. During other butterfly stages with radix $R_c$ (including $R_{min}$), there are $$N_c = \left\lfloor \frac{R_{max}}{R_c} \right\rfloor$$

accumulators 320 in use and the results of the $R_c$ multipliers are linked to $N_c$ accumulators 320.

In some embodiments, the number of implemented intra-stage multipliers 316 is greater than $R_{max}-1$. When the network communication system 200 requires more performance, the number of intra-stage multipliers 316 implemented by the configurable FFT apparatus 300 is increased by the product of a predetermined FFT scaling integer and $R_{max}-1$ such that the computation capacity is relatively increased according to the value of the predetermined integer.

An example of an implementation of the configurable FFT apparatus 300 is described below with regard to a 3780 FFT structure. The 3780 FFT structure is applied in Chinese terrestrial TV broadcasting system and contains radix-2, 3, 5 and 7 stages. FIG. 4 depicts a schematic block diagram of another embodiment of the configurable FFT apparatus 400. The configurable FFT apparatus 400 includes an input address generator 302, a data input module 304, an output address generator 306, a data output module 308, an interconnect module 310, and an intra-stage twiddle generator 314, and an inter-stage twiddle generator 316. Additionally, the configurable FFT apparatus 400 also includes six intra-stage multipliers 414, 422, 424, 426, 428, and 430, or $M_1$-$M_6$, and an input data line $D_1$ 440. In one embodiment, the first twiddle factor is always "1", hence, the input data line $D_1$ 440 is sent directly to the interconnect module 310.

Additionally, the configurable FFT apparatus 400 also includes three accumulators 418, 432, and 434, or $A_1$-$A_3$, and three inter-stage multipliers 420, 436, and 438 paired respectively with each of the three accumulators 418, 432, and 434. Since the depicted configurable FFT apparatus 400 of FIG. 4 is one potential embodiment of the configurable FFT apparatus 300 of FIG. 3, the components of the depicted configurable FFT apparatus 400 of FIG. 4 function substantially similar to the components described above with regard to the configurable FFT apparatus 300 of FIG. 3, except as noted below.

In one embodiment, since the maximum radix, $R_{max}$, of the 3780 example of FIG. 4 is 7 and the first twiddle factor is always 1, there are 6 intra-stage multipliers 414 configured for the configurable FFT apparatus 400. As the minimum radix, $R_{min}$, for the 3780 example is 2, the maximum number of calculations running in parallel, $N_{max}$, is $$\left\lfloor \frac{7}{2} \right\rfloor = 3.$$

In this example, the number of accumulators is set by $N_{max}$, so the number of accumulators is also 3. As depicted in FIG. 4, the most number of parallel calculations possible for the 3780 implementation is also 3. That means when the 3780 example of FIG. 4 is used for a radix-2 butterfly stage, the configurable FFT apparatus 400 performs 3 butterfly calculations in parallel.

In one embodiment, the number of intra-stage multipliers implemented by the configurable FFT apparatus 400 is increased by the product of a predetermined integer and $R_{max}-1$, or 6 in the present example with reference to FIG. 4. For example, in order to increase performance, the predetermined FFT scaling integer may be set at two (2) by the configurable FFT apparatus 400. The six intra-stage multipliers depicted in FIG. 4 ($M_1$-$M_6$) would then increase to twelve intra-stage multipliers ($M_1$-$M_{12}$) from the product $2 \times (R_{max}-1)$ where $R_{max}=7$ with reference to FIG. 4.

The value of the FFT scaling integer also affects the number of parallel FFT calculations per radix configuration. The maximum number of parallel calculations per radix configuration is determined by the product of the FFT scaling integer and $N_{max}$. As explained above, for radix-2, the maximum number of calculations running in parallel is 3, when the FFT scaling integer is set at "one". Furthermore, when the FFT scaling integer is set at two (2) with reference to the configurable FFT apparatus 400 of FIG. 4, the maximum number of parallel calculations for radix-2 configurations is six, from $2 \times N_{max}$, or $$2 \times \left\lfloor \frac{7}{2} \right\rfloor = 6.$$

For radix-3 configurations, the maximum number of parallel calculations would be four, from $2 \times N_{max}$, or $$2 \times \left\lfloor \frac{7}{3} \right\rfloor = 4.$$

For radix-5 configurations, the maximum number of parallel calculations would be two, from $2 \times N_{max}$, or $$2 \times \left\lfloor \frac{7}{5} \right\rfloor = 2.$$

And for radix-7 configurations, the maximum number of parallel calculations would be two, from $2 \times N_{max}$, or $$2 \times \left\lfloor \frac{7}{7} \right\rfloor = 2.$$

To better explain the operation of the interconnect module 310 of FIG. 4, the 3780 FFT structure example is continued with regard to FIG. 5 below.

Figure 5B:
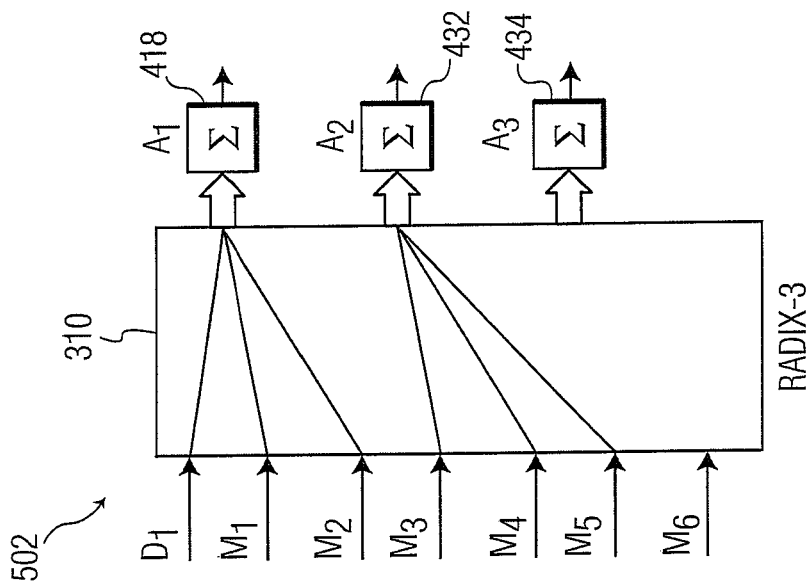
Figure 5A:
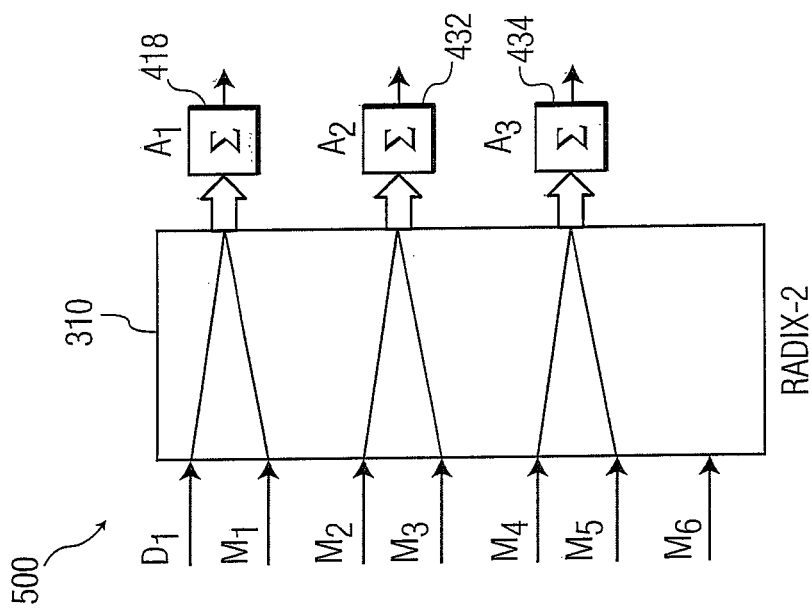
Figure 5D:
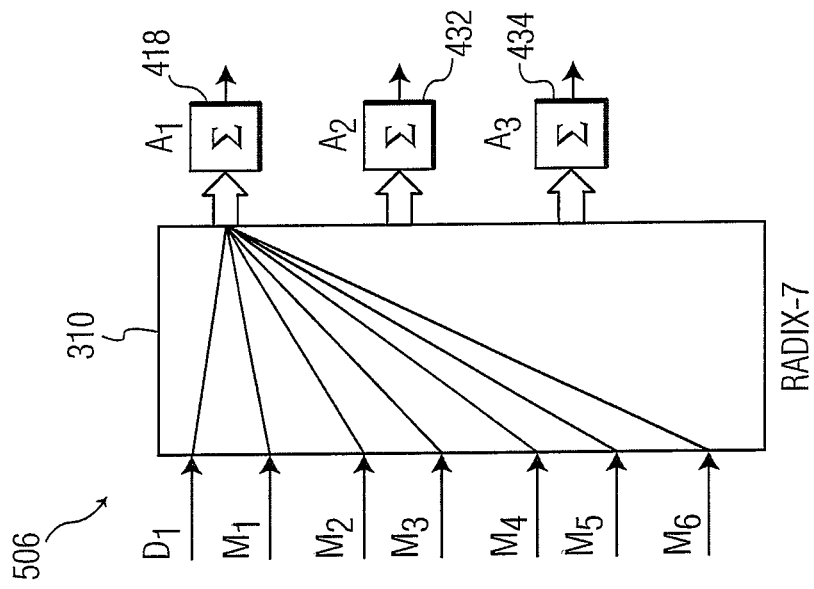
Figure 5C:
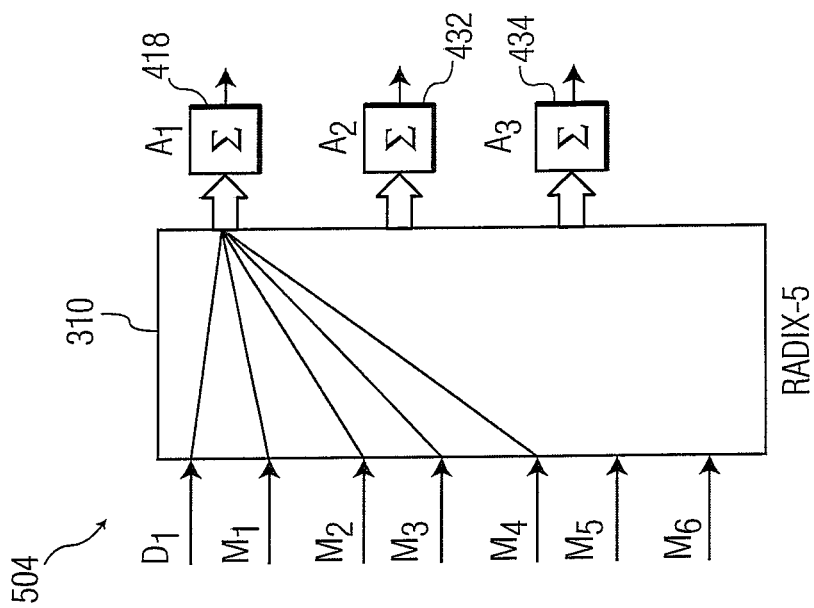

FIGS. 5A, 5B, 5C, and 5D depict schematic block diagrams of several butterfly interconnection operations of the configurable FFT apparatus of FIG. 4. FIGS. 5A, 5B, 5C, and 5D depict the physical routing links implemented by the interconnect module 310 linking the results of the intra-stage multipliers 414, 422, 424, 426, 428, and 430 with the accumulators 418, 432, and 434. FIG. 5A depicts the physical routing links 502 by the interconnect module 310 during the radix-2 stage. FIG. 5B depicts the physical routing links 504 implemented by the interconnect module 310 during the radix-3 stage. FIG. 5C depicts the physical routing links 506 implemented by the interconnect module 310 during the radix-5 stage. And FIG. 5D depicts the physical routing links 508 implemented by the interconnect module 310 during the radix-7 stage.

In the radix-2 stage embodiment, the interconnect module 310 links the first data line $D_1$ 440 from the data input module 304 and the result of the $M_1$ intra-stage multiplier 414 to the $A_1$ accumulator 418. Additionally, the interconnect module 310 links the results of the $M_2$ and $M_3$ intra-stage multipliers 422 and 424 to the $A_2$ accumulator 432. Additionally, the interconnect module 310 links the results of the $M_4$ and $M_5$ intra-stage multipliers 426 and 428 to the $A_3$ accumulator 434. The $M_6$ intra-stage multiplier 430 may be unused, or disabled, in the radix-2 stage embodiment.

In the radix-3 stage embodiment, the interconnect module 310 links the first data line $D_1$ 440 and the results of the $M_1$ and $M_2$ intra-stage multipliers 414 and 422 to the $A_1$ accumulator 418. Additionally, the interconnect module 310 links the results of the $M_3$, $M_4$, and $M_5$ intra-stage multipliers 424, 426, and 428 to the $A_2$ accumulator 432. Again, the $M_6$ intra-stage multiplier 430 may be unused, or disabled, for the radix-3 stage embodiment.

In the radix-5 stage embodiment, the interconnect module 310 links the first data line $D_1$ 440 and the results of the $M_1$, $M_2$, $M_3$, and $M_4$ intra-stage multipliers 414, 422, 424, and 426 to the $A_1$ accumulator 418. The $M_5$ and $M_6$ intra-stage multipliers 428 and 430 may be unused, or disabled, in the radix-5 stage embodiment.

In the radix-7 stage embodiment, the interconnect module 310 links the first data line $D_1$ and the results of the $M_1$, M2, M3, M4, M5, and M6 intra-stage multipliers 414, 422, 424, 426, 428, and 430 to the $A_1$ accumulator 418. All of the intra-stage multipliers 414, 422, 424, 426, 428, and 430 are enabled by the configurable FFT apparatus 400 in the radix-7 stage embodiment. By adjusting the butterfly interconnection in this manner, the configurable FFT apparatus 400 enables multiple radix calculations. For example, the 3780 configurable FFT apparatus 400 enables not only 3780 FFT but any FFT computation of radix-2 through 7 stages.

FIG. 6 depicts a schematic flow chart diagram of one embodiment of a configurable FFT method 660 for use with the configurable FFT apparatus 300 of FIG. 3. Although the configurable FFT method 600 is described in conjunction with the configurable FFT apparatus 300 of FIG. 3, some embodiments of the method 600 may be implemented with other types of FFT apparatuses.

At block 602, the configurable FFT apparatus 300 determines the specific radix configuration associated with a given signal. For example, for a 3780 FFT structure, the radix configuration includes stages for radix-2, 3, 5, and 7. At block 604, the configuration manager 312 configures a butterfly interconnection to perform a multi-mode radix FFT computation according to the determination of the specific radix configuration of the given signal. The configuration manager 312 adjusts the butterfly interconnection in order to compute FFT algorithms for each radix stage of the determined radix configuration. Adjustments of the butterfly interconnection include adjustments of the interconnect module 310, the intra-stage twiddle generator 314, the intra-stage multipliers 316, the inter-stage twiddle generator 318, the accumulators 320, and/or the inter-stage multipliers 322.

At block 606, the BS transmitter 210 modulates the given signal with the configurable FFT apparatus 300, according to a multi-mode radix FFT computation, and transmits the given signal to the UE receiver 222. In some embodiments, the UE transmitter 220 transmits a signal to the BS receiver 212. In one embodiment, the multi-mode radix FFT computation includes a mixed FFT recursive algorithm to decompose an N point discrete Fourier transform according to the determination of the current radix configuration.

At block 608, the UE receiver 222 receives and implements the configurable FFT apparatus 300 to demodulate the received signal with the multi-mode radix FFT computation according to the determination of the current radix configuration. For example, for a 3780 FFT structure, which includes stages for radix-2, 3, 5, and 7, the configuration manager adjusts the interconnect module 310, the intra-stage twiddle generator 314, the intra-stage multipliers 316, the inter-stage twiddle generator 318, the accumulators 320, and/or the inter-stage multipliers 322 to perform a radix-7 FFT computation. The configuration manager also adjusts the interconnect module 310, the intra-stage twiddle generator 314, the intra-stage multipliers 316, the inter-stage twiddle generator 318, the accumulators 320, and/or the inter-stage multipliers 322 to perform a radix-5 FFT computation, and so on. Thus, as a single dedicated FFT computational device, the configurable FFT apparatus 300 adjusts the components of the butterfly interconnection in order to perform each stage of the 3780 FFT structure.

Embodiments of the configurable FFT apparatus 300 and configurable FFT method 600 enables the base station 202 and the UE 208 to perform FFT algorithms for power-of-2 radix configurations and non-power-of-2 radix configurations alike from a single dedicated FFT structure. Performing mixed radix computations on a single dedicated FFT structure substantially reduces FFT computation load for a network communication system 200, substantially reducing computation times and computation power requirements.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to determine the specific radix configuration associated with a given signal, an operation to configure an FFT butterfly interconnection to perform a multi-mode radix FFT computation according to the determination of the specific radix configuration of the given signal, and an operation to compute a mixed FFT recursive algorithm to decompose an N point discrete Fourier transform according to the determination of the current radix configuration.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A configurable fast Fourier transform (FFT) apparatus comprising:

a data input to retrieve an input data segment from a memory device;

a data output to store processed data to the memory device;

an interconnect coupled between the data input and the data output, the interconnect to route radix FFT signals of multi-type radix configurations from the data input to the data output; and a configuration manager coupled to the interconnect, the configuration manager to dynamically configure the interconnect according to a determination of a current radix configuration;

further comprising a plurality of intra-stage multipliers coupled between the data input and the interconnect, the plurality of intra-stage multipliers to receive an input data segment from the data input, wherein the data input is further configured to direct the input data segment to at least one of the plurality of intra-stage multipliers in response to a determination that the current radix configuration is a non-radix-2 configuration;

further comprising an intra-stage twiddle generator coupled to the plurality of intra-stage multipliers, the intra-stage twiddle generator to generate intra-stage twiddle factors and to communicate the intra-stage twiddle factors to the plurality of intra-stage multipliers according to the determination of the current radix configuration, wherein at least one of the plurality of intra-stage multipliers is configured to multiply the input data segment by one of the intra-stage twiddle factors according to the determination of the current radix configuration;

further comprising a plurality of accumulators coupled between the interconnect and the data output, each accumulator to accumulate a product of at least one plurality of intra-stage multipliers, wherein the interconnect is further configured to direct the product of one of the at least one intra-stage multipliers to a corresponding accumulator according to the configuration of the interconnect based on the current radix configuration; and further comprising a plurality of inter-stage multipliers coupled between the plurality of accumulators and the data output, each inter-stage multiplier to receive an accumulated data segment from one of the accumulators.

2. The configurable FFT apparatus of claim 1, further comprising an inter-stage twiddle generator coupled to the plurality of inter-stage multipliers, the inter-stage twiddle generator to generate inter-stage twiddle factors and to communicate the inter-stage twiddle factors to the plurality of inter-stage multipliers according to the determination of the current radix configuration, wherein at least one of the plurality of inter-stage multipliers is configured to multiply the accumulated data segment by one of the inter-stage twiddle factors according to the determination of the current radix configuration.

3. The configurable FFT apparatus of claim 1, further comprising:

an input address generator to supply an input data address for the input data segment; and an output address generator to supply an output data address for the processed data.

4. The configurable FFT apparatus of claim 1, wherein the configuration manager is further configured to determine a prime factor of a number of a plurality of discrete data inputs in the input data segment in order to control a sequence of operations of the interconnect according to the determination of the current radix configuration.

5. The configurable FFT apparatus of claim 1, wherein the FFT apparatus is further configured to perform parallel radix calculations based on a number of accumulators which are implemented.

6. The configurable FFT apparatus of claim 1, wherein the multi-type radix configurations comprise a radix-2 configuration and a non-radix-2 configuration.

7. A configurable FFT method, the method comprising:
supplying an input data address for an input data segment, wherein the input data segment comprises a plurality of discrete data inputs;
determining a radix configuration of an input data segment from a data input, wherein the data input retrieves the input data segment from a memory device;
storing processed data to the memory device;
supplying an output data address for the processed data;
dynamically configuring an interconnect to route radix FFT signals of multi-type radix configurations from the data input to the data output according to the determination of the current radix configuration;
further comprising: receiving an input data segment from the data input; and directing the input data segment to at least one of a plurality of intra-stage multipliers in response to a determination that the current radix configuration is a non-radix-2 configuration;
further comprising: generating intra-stage twiddle factors; communicating the intra-stage twiddle factors to the plurality of intra-stage multipliers according to the determination of the current radix configuration; and multiplying the input data segment by one of the intra-stage twiddle factors according to the determination of the current radix configuration;
further comprising: directing the product of one of the plurality of intra-stage multipliers to one of a plurality of accumulators according to the configuration of the interconnect and the current radix configuration; and accumulating the product of the intra-stage multipliers in the corresponding accumulator; and
further comprising: receiving an accumulated data segment from one of the plurality of accumulators; and directing the accumulated data segment to at least one of a plurality of inter-stage multipliers in response to a determination that the current radix configuration is a non-radix-2 configuration.

8. The configurable FFT method of claim 7, further comprising:
generating inter-stage twiddle factors;
communicating the inter-stage twiddle factors to the plurality of inter-stage multipliers according to the determination of the current radix configuration; and
multiplying the accumulated data segment by one of the inter-stage twiddle factors according to the determination of the current radix configuration.

9. The configurable FFT method of claim 7, further comprising determining a prime factor of the number of the plurality of discrete data inputs in the input data segment in order to control a sequence of operations of the interconnect according to the determination of the current radix configuration.

10. The configurable FFT method of claim 7, further comprising performing parallel radix calculations based on a number of accumulators which are implemented.

11. An FFT apparatus, comprising:
means for supplying an input data address for an input data segment, wherein the input data segment comprises a plurality of discrete data inputs;
means for determining a radix configuration of an input data segment from a data input, wherein the data input retrieves the input data segment from a memory device;
means for storing processed data to the memory device;
means for supplying an output data address for the processed data;
means for dynamically configuring an interconnect to route radix FFT signals of multi-type radix configurations from the data input to the data output according to the determination of the current radix configuration;
means for directing the input data segment to at least one of a plurality of intra-stage multipliers according to the determination of the current radix configuration;
means for generating intra-stage twiddle factors;
means for communicating the intra-stage twiddle factors to the plurality of intra-stage multipliers according to the determination of the current radix configuration;
means for multiplying the input data segment by one of the intra-stage twiddle factors according to the determination of the current radix configuration; means for directing the product of one of the plurality of intra-stage multipliers to one of a plurality of accumulators according to the configuration of the interconnect and the current radix configuration;
means for accumulating the product of the plurality of intra-stage multipliers in the corresponding accumulators;
means for receiving an accumulated data segment from one of the plurality of accumulators;
means for directing the accumulated data segment to at least one of the plurality of inter-stage multipliers according to the determination of the current radix configuration;
means for generating inter-stage twiddle factors;
means for communicating the inter-stage twiddle factors to the plurality of inter-stage multipliers according to the determination of the current radix configuration; and
means for multiplying the accumulated data segment by one of the inter-stage twiddle factors according to the determination of the current radix configuration.

* * * * *